United States Patent [19]
Sheets

[11] Patent Number: 5,062,749
[45] Date of Patent: Nov. 5, 1991

[54] TOOL COUPLER

[76] Inventor: Harold D. Sheets, 12556 White Chapel Ave., Baton Rouge, La. 70810

[21] Appl. No.: 313,582

[22] Filed: Feb. 21, 1989

[51] Int. Cl.$^5$ .............................................. B23B 31/10
[52] U.S. Cl. .................................. 408/240; 408/226; 279/1 SG; 279/1 E; 279/75; 279/1 B
[58] Field of Search ........... 408/240, 232, 226, 239 R; 279/1 F, 1 B, 22, 30, 76, 79, 82, 87, 102, 103, 74, 75, 1 E, 156; 82/160

[56] References Cited

U.S. PATENT DOCUMENTS

| | | | |
|---|---|---|---|
| 1,028,675 | 6/1912 | Chase et al. | 279/22 X |
| 1,168,540 | 1/1916 | Musselman . | |
| 1,602,708 | 10/1926 | Russell . | |
| 1,645,948 | 10/1927 | Galloway et al. . | |
| 1,806,540 | 5/1931 | Cummings . | |
| 2,320,360 | 6/1943 | Grey | 279/79 |
| 2,345,495 | 3/1944 | Onsrud | 279/103 |
| 2,425,988 | 8/1947 | Brisben | 279/103 |
| 3,100,118 | 8/1963 | Terao | 279/103 |
| 3,111,329 | 11/1963 | Steinmann | 279/102 |
| 3,153,434 | 10/1964 | Shimokawa | 145/53 |
| 3,436,086 | 4/1969 | Glenzer | 279/30 |
| 3,521,895 | 7/1970 | Smith | 279/22 |
| 3,684,302 | 8/1972 | Herman | 279/75 |
| 3,734,516 | 5/1973 | Smith | 279/75 |
| 3,762,732 | 10/1973 | Speed | 279/102 |
| 3,767,218 | 10/1973 | Linthicum | 279/102 |
| 4,006,996 | 2/1977 | Kasabian | 279/102 |
| 4,692,073 | 9/1987 | Martindell | 279/75 |

FOREIGN PATENT DOCUMENTS

| | | | |
|---|---|---|---|
| 858924 | 10/1952 | Fed. Rep. of Germany | 279/87 |
| 2347816 | 11/1972 | Fed. Rep. of Germany | 279/103 |
| 3419465 | 11/1985 | Fed. Rep. of Germany | 279/75 |
| 477320 | 12/1948 | Italy | 279/82 |
| 473934 | of 1952 | Italy | 279/82 |
| 293415 | 11/1928 | United Kingdom | 279/103 |

Primary Examiner—Larry I. Schwartz
Assistant Examiner—Robert Schultz
Attorney, Agent, or Firm—Robert C. Tucker; William David Kiesel

[57] ABSTRACT

A tool coupler is provided, comprising an elongated body having upper and lower ends and further including a non-circular first axial bore extending at least partially through the body from the upper end toward the lower end, a flange extending radially from the body, and at least one radial bore communicating between the first axial bore and the exterior of the body, the radial bore being located just above the flange. A collar is positioned around the body, the collar having upper and lower ends, an inner wall and an outer wall, and an annular retaining flange extending radially from the inner wall, the retaining flange being alignable with the radial bore. A cap is positioned in the collar, the cap having an upper surface, an annular outer surface facing the inner surface of the collar, an annular lower surface, the cap further including an axial opening at least as large as and aligned with the first axial bore in the body. A first spring is positioned between the cap and the annular flange of the collar, urging the cap against the upper end of the collar. At least one ball is positioned in the radial bore, the ball having a greater length than the radial bore such that when the retaining flange of the collar is aligned with the radial bore, the ball is urged at least partially into the first axial bore to grip a tool shank.

15 Claims, 3 Drawing Sheets 5,062,749

TOOL COUPLER

BACKGROUND OF THE INVENTION

1. Field of the Invention

This invention relates to tool couplers which hold the shank of an elongated tool and, more particularly, to tool couplers, or chucks, which hold rotating tools such as drill bits.

2. Prior Art

The most popular prior art couplers, or chucks, are those which are used on most power drills. The shank of the tool or bit is held in place by a friction grip, which is adjusted using a key. If the grip is not adequately tightened with the key, the grip on the shank will slip, necessitating retightening of the chuck. More importantly, the user of such a coupler must keep track of the location of the key, or the device is useless. Misplaced keys are a constant problem. Also, the time required to change bits is lengthy, due to the time required in loosening and tightening the grip on the shank.

Some devices have been designed to drive a bit having a shank of non-circular cross-section. Such shanks, usually having square or hexagonal cross-sections, may be driven by chucks which have matching sockets, eliminating the need for a friction grip and thus the key. It is necessary, however, in such devices to maintain some grip on the shank in order to hold the shank longitudinally within the chuck. This is usually accomplished by use of a spring-loaded sleeve, which urges one or more balls against the drill shank, holding it in place. Such devices are operated by positioning the sleeve with one hand to loosen the grip of the balls, and either inserting or removing the bit shank with the free hand. The drill or other rotative power tool must be released and manipulated in order for the user to operate the chuck with both hands. This process is time-consuming and cumbersome.

SUMMARY OF THE INVENTION

Therefore, it is an object of this invention to provide a tool coupler which eliminates the need for a separate tool or key to operate the coupler.

It is another object of this invention to provide a tool coupler which automatically locks a tool shank in place when it is inserted into the tool coupler.

It is yet another object of this invention to provide a tool coupler which, when actuated, ejects the tool shank when it is desirable to remove it.

It is a further object of this invention to provide a tool coupler which is capable of maintaining an acceptable grip on a tool while centering of the tool during high and low speed operation.

It is still another object of this invention to provide a tool coupler which will accomplish all of the above objects.

Accordingly, a tool coupler is provided, comprising an elongated body having upper and lower ends and further including a non-circular first axial bore extending at least partially through the body from the upper end toward the lower end, a flange extending radially from the body, and at least one radial bore communicating between the first axial bore and the exterior of the body, the radial bore being located just above the flange. A collar is positioned around the body, the collar having upper and lower ends, an inner wall and an outer wall, and an annular retaining flange extending radially from the inner wall, the retaining flange being alignable with the radial bore. A cap is positioned in the collar, the cap having an upper surface, an annular outer surface facing the inner surface of the collar, an annular lower surface, the cap further including an axial opening at least as large as and aligned with the first axial bore in the body. A first spring is positioned between the cap and the annular flange of the collar, urging the cap against the upper end of the collar. At least one ball is positioned in the radial bore, the ball having a greater length than the radial bore such that when the retaining flange of the collar is aligned with the radial bore, the ball is urged at least partially into the first axial bore to grip a tool shank.

Additional features are disclosed in the following paragraphs and drawings which enhance the operation of the invention. Upon an examination of the detailed description of the invention, other objects and advantages of the invention will occur to those skilled in the art.

DETAILED DESCRIPTION OF PREFERRED EMBODIMENTS OF THE INVENTION

Figure 1:
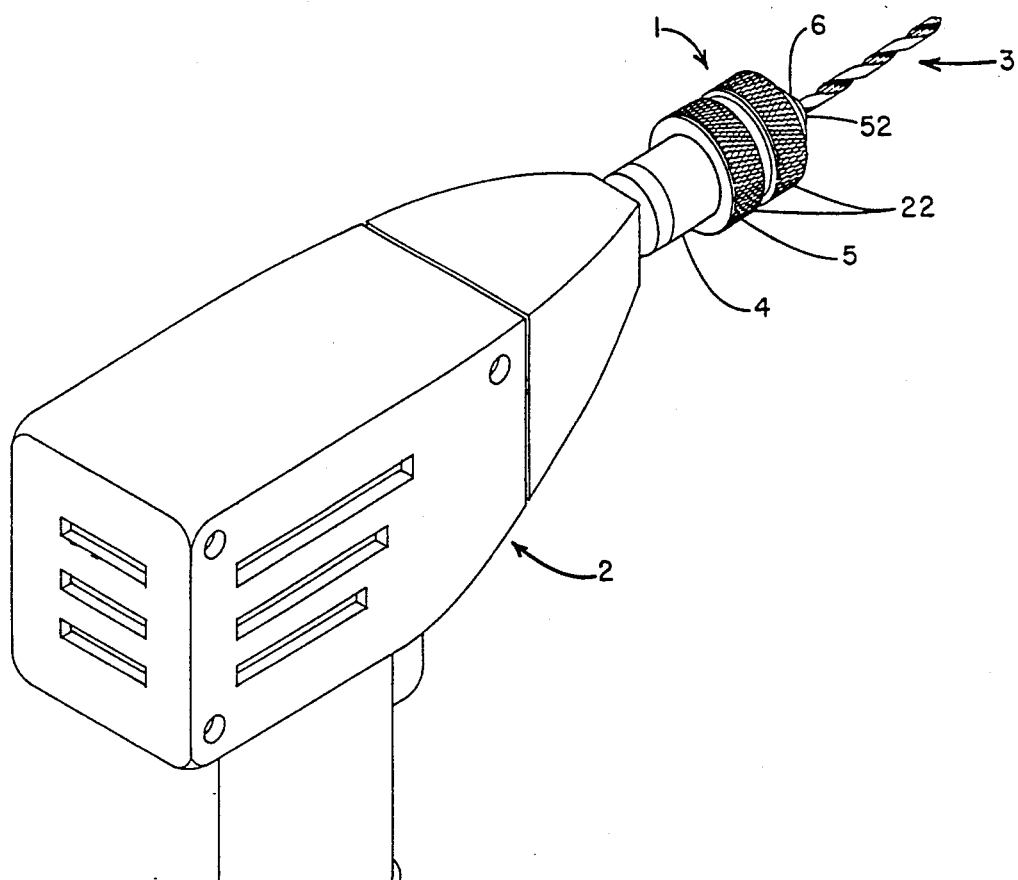
FIG. 1 is a perspective view of the invention in place on a power drill.
Figure 2:
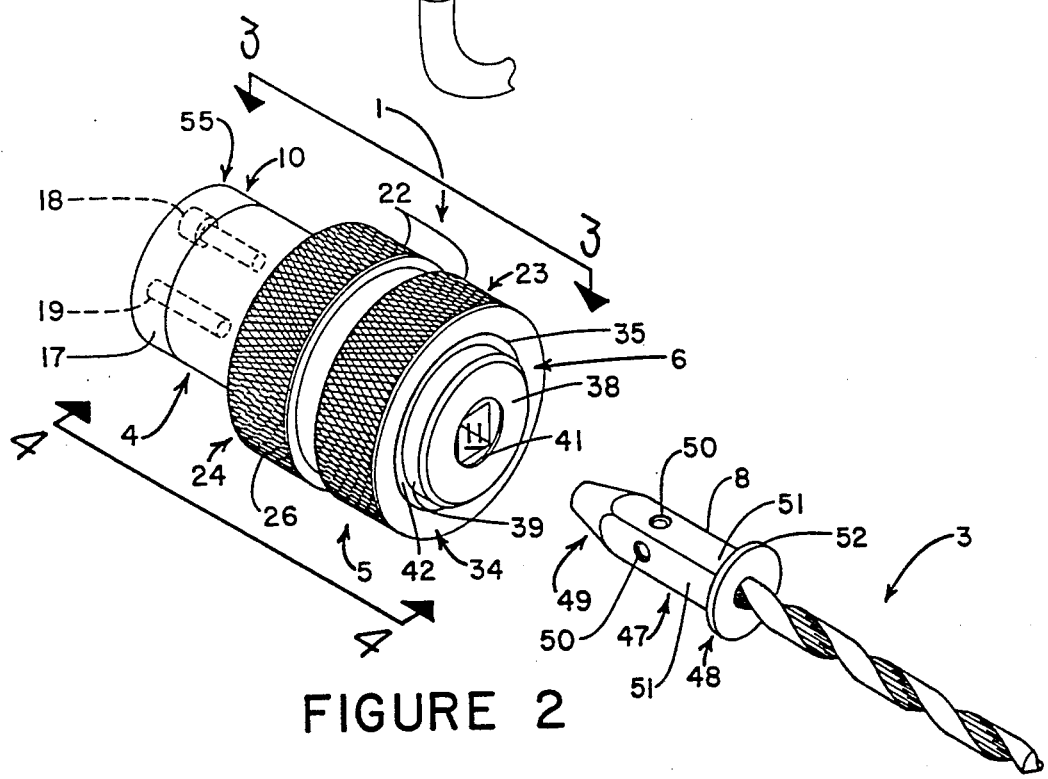
FIG. 2 is a perspective view of a preferred embodiment the invention.
Figure 3:
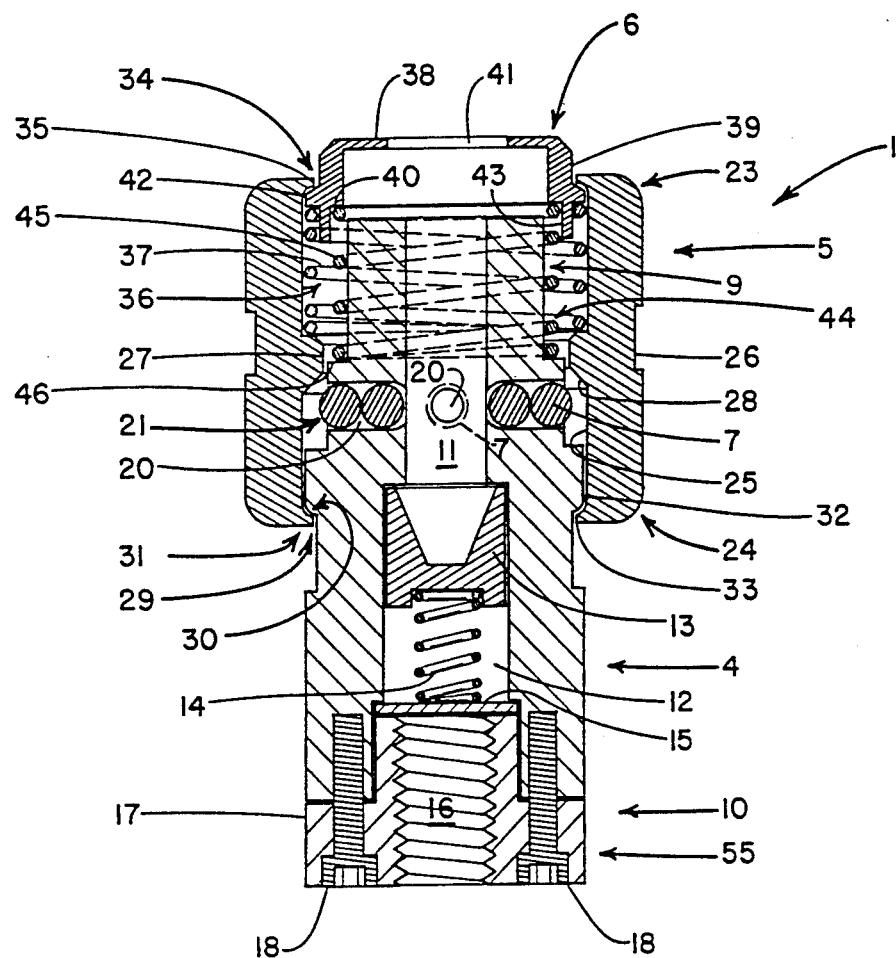
FIG. 3 is a sectional view, taken along section line 3—3 of FIG. 2, of a preferred embodiment of the invention before a tool shank is inserted therein.
Figure 4:
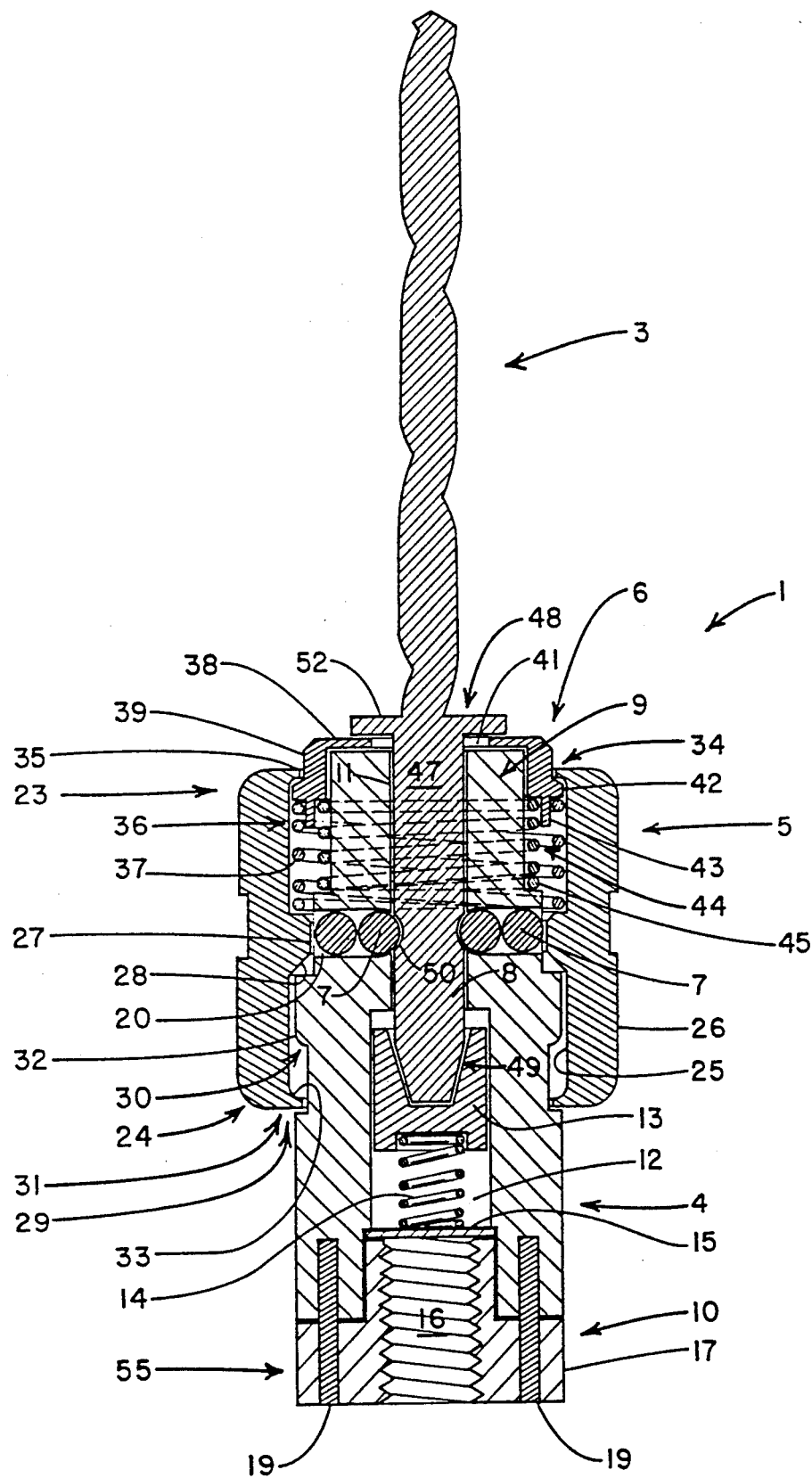
FIG. 4 is a sectional view, taken along section line 4—4 of FIG. 2, of a preferred embodiment of the invention with a tool shank inserted therein.

As shown in FIG. 1, the tool coupler 1 may be attached to an appliance, such as a rotary drill 2. A tool, such as a bit 3, is attachable to the coupler 1. FIGS. 2-4 show the invention in greater detail. The coupler 1 generally comprises a body 4, a collar 5 and a cap 6. As can be seen, the coupler 1 urges means 21 for gripping a tool shank, such as balls 7 against tool shank 8, holding shank 8 longitudinally in place. The non-circular shape of at least a portion of shank 8 eliminates the need for frictionally gripping shank 8 to impart rotative force to shank 8. The following paragraphs will provide greater detail concerning the unique qualities of the coupler 1.

Body 4 is of an elongated shape and has an upper end 9 and a lower end 10. Generally, upper end 9 receives shank 8 and lower end 10 is attachable to an appliance, such as drill 2. Body 4 is provided with a non-circular first axial bore 11, running at least partially through body 4 from upper end 9 toward lower end 10. Of course, first axial bore 11 should be shaped so as to matingly receive a shank 8 having the same cross-section. First axial bore 11 and shank 8 are shown having square cross-sections. However, any non-circular cross-section will suffice, so long as rotative forces are transferable to shank 8. Also, it is not necessary that the entire shank 8 have the non-circular cross-section. Again, it is important that enough of the length of shank 8 has a non-circular cross-section so as to adequately transfer rotative forces from the coupler 1 to the shank 8. First axial bore 11 should extend into body 4 at least far enough to receive a desired length of shank 8.

While not essential for operation of the coupler 1, a second axial bore 12 is provided in body 4. Second axial bore 12 is concentric with and communicates with first axial bore 11, extending toward the lower end 10 of body 4. Second axial bore 12 contains a plunger means 13 and spring means 14, such as the coil spring shown. Spring means 14 is supported by plate 15. The function of plunger means 13 will be explained in detail below.

Threaded bore 16 provides a means 55 to connect the lower end 10 of body 4 to an appliance, such as a drill 2. As shown, threaded bore 16 may be provided in a lower section 17 of body 4, which is removable, and which serves to contain plate 15, spring means 14 and plunger means 13. Lower section 17 is held in place by 18 and pins 19. Of course, the means 55 to connect lower end 10 to appliance 2 may vary according to the type of appliance 2 to which the coupler 1 is to be connected.

Body 4 is also provided with at least one radial bore 20, communicating between first axial bore 11 and the exterior of body 4, as shown. A means 21 for gripping tool shank 8 is positioned in radial bore 20. Means 21 should be longer than radial bore 20, so that when urged from the outer end of radial bore 20, means 21 will protrude into first axial bore 11, gripping shank 8 (see FIG. 4). As shown, means 21 preferably comprises one or more balls 7, positioned in radial bore 20. Radial bore 20 should be of a slightly smaller diameter than that of a ball 7 at the point where radial bore 20 enters first axial bore 11, such that part of ball 7 will protrude into first axial bore 11, but the entire ball 7 will not fall into first axial bore 11. For the square-shaped first axial bore 11 and shank 8, it is preferred that four radial bores 20 be utilized, as shown. If a smaller diameter radial bore 20 is preferred, it may be necessary to utilize a plurality of balls 7, as shown, in order to achieve a length slightly greater than that of radial bore 20.

Collar 5 is positioned around body 4, as shown. Collar 5 has an upper end 23, a lower end 24, an inner wall 25, and an outer wall 26. Outer wall 26 may be knurled, as shown in FIGS. 1 and 2 at 22, for ease of handling. An annular retaining flange 27 extends radially inward from inner wall 25, and is alignable with radial bore(s) 20, so as to urge means 21 (ball(s) 7) into radial bore(s) 20 toward first axial bore 11 when so aligned. It is preferred that retaining flange 27 be provided with a ramp surface 28 on the side of retaining flange 27 nearest to lower end 24 of collar 5. Ramp surface 28 provides a smooth transition surface on which to urge ball(s) 7 into radial bore(s) 20.

A means 29, connected to body 4 and collar 5, is provided in order to retain collar 5 in position around body 4. It is preferred that means 29 comprise a body stop 30 and a collar stop 31. Body 4 is provided with a body stop 30, extending radially from body 4. Body stop 30 serves to provide a stop for collar 5 during operation of the coupler 1 as will be explained below. It is preferred that body stop 30 further comprise an annular flange 32, integrally formed with body 4. Collar stop 31 extends radially inward from collar 5 between body stop and lower end 10 of body 4, such that collar 5 is prevented from sliding off upper end 9 of body 4 by contact between body stop 30 and collar stop 31, as shown in FIG. 3. Collar stop 31 may take various forms known in the art. As shown, collar stop 31 may be formed integrally with collar 5, and may be as simple as a lower edge 33 of collar 5 turned inward toward body 4.

The coupler 1 will operate utilizing only body 4, balls 7 and collar 5. Collar 5 is simply pulled toward upper end 9 of body 4, allowing balls 7 to retract. While collar 5 is in this extended position, a shank 8 is inserted. Collar 5 is then pulled back toward lower end 10 of body 4, and retaining flange 27 urges balls 7 into contact with shank 8, holding it longitudinally in place. In this simple form, no springs are necessary and no flange 52 is required on shank 8. However, for increased ease of operation and accomplishment of all the objectives of the invention, several additional elements are preferred.

A cap 6 is positioned inside collar 5, and is retained inside collar 5 by a means 34 for retaining cap 6 within collar 5. Means 34 may be formed integrally with collar 5, such as an upper edge 35 of collar 5 turned inward toward body 4. A first resilient means 36, such as first coil spring 37, is positioned between cap 6 and retaining flange 27 of collar 5. First resilient means 36 thus maintains axial separation between cap 6 and retaining flange 27. Cap 6 has an upper surface 38, an annular outer surface 39 and an annular lower surface 40. An axial opening 41 is provided in cap 6 and at least as large as and aligned with first axial bore 11 of body 4, such that shank 8 may be inserted through opening 41. The operation of cap 6 may be enhanced by the addition of an annular outer flange 42, extending radially from outer surface 39, as well as an axial annular flange 43, extending axially from lower surface 40. First coil spring 37 bears against flange 42, aiding separation between first coil spring 37 and a second resilient means 44, described below. Axial flange 43 further aids such separation.

While the coupler 1 will operate utilizing only those features described above, it is preferred that a second resilient means 44 be provided urging separation between the cap/collar unit (cap 6, collar 5 and first resilient means 36) and body 4. Second resilient means 44 is positioned between body 4 and cap 6, and preferably comprises a second coil spring 45, bearing against lower surface 40 of cap 6 at one end and body 4 at the other. Shoulder 46 may be provided on body 4 in order to seat second spring 45, as shown. Of course, any means known in the art may be used to seat second spring 45 on body 4. As described above, axial flange 43 separates first coil spring 37 from second coil spring 45. Of course, the diameter of second spring 45 is less than that of first spring 37.

Second resilient means 44 maintains collar 5 in an upward position, as shown in FIG. 2, when no shank 8 is inserted in coupler 1. Also, second resilient means 44 provides additional force to eject shank 8 when it is released.

Figure 5:
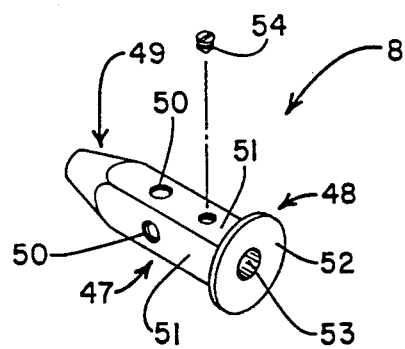
FIG. 5 is a perspective view of an alternate embodiment of the tool shank of the invention.

As shown in FIGS. 2 and 5, any tool 3 utilized with the coupler 1 is provided with a shank 8 having an elongated body 47 having an upper end 48 and a lower end 49. At least a portion of shank 8 is provided with a non-circular cross-section such that shank 8 may be matingly inserted into first axial bore 11 of body 4. It is preferred that most of the length of shank 8 be of such non-circular cross-section to prevent undue stressing of shank 8 when torque is applied thereto. Lower end 49 of shank may take a truncated cone shape, as shown, such that lower end 49 will seat in plunger means 13. Lower end 49 may also be chamfered or beveled to accomplish the same result. This arrangement aids in centering the shank 8 when it is inserted. Of course, lower end 49 may take various other shapes in order to matingly match a plunger means 13 utilized in a particular application. Shank 8 is preferably provided with indentations 50, in which balls 7 will seat when shank 8 is inserted in the coupler 1. When shank 8 is multi-sided, as shown, it is preferred that an indentation 50 be provided on each side 51, and that radial bores 20 (and balls 7), alignable with indentations 50, be provided in body 4 so as to correspondingly positively grip shank 8 at each indentation 50. Each indentation 50 should be shaped so as to matingly receive a portion of a ball 7. Of course, shank 8 will connect to a tool 3, such as the drill bit shown in the Figures. Other tools 3, such as screwdrivers, tapping tools, etc., may be welded or otherwise attached to shank 8. An alternate embodiment of shank 8 is shown in FIG. 5. A tool 3 (not shown) may be inserted in shank bore 53, and may be secured by set screw 54. Thus, multiple tools 3 could be utilized with a single shank 8.

Shank 8 will function as described above with the coupler 1 in its basic form. However, for ease of operation it is preferred that shank 8 include a flange 52 extending radially from shank 8, preferably from upper end 48. When shank 8 is in place in coupler 1, second resilient means 44 urges cap 6 against flange 52, providing a longitudinal force to eject shank 8 when it is released. Also, flange 52 provides a stop against which cap 6 rests, providing a downward (toward lower end 10 of body 4) f through first resilient means 36 against collar 5, locking collar 5 in place.

Operation of the coupler 1 is very simple. As shown in FIG. 3, collar 5 is biased upward by second resilient means 44 when shank 8 is not inserted. Thus, coupler 1 is always ready to receive a shank 8 without any additional manipulation of the collar 8. When shank 8 is inserted, resistance is encountered when lower end 49 of shank 8 contacts plunger means 13 and when flange 52 of shank 8 contacts cap 6. As shank 8 is pressed into axial bore 11, retaining flange 27 of collar 5 is urged into contact with balls 7. When indentations 50 line up with radial bores 20, balls 7 are urged toward axial bore 11 and lock shank 8 in place, as shown in FIG. 4. As explained above, collar 5 and retaining flange 27 are biased to hold the shank 8 in place by first resilient means 36. To release shank 8, collar 5 is simply urged upward (away from lower end 10 of body 4) until retaining flange 27 moves away from radial bores 20. Second resilient means 44 and spring means 14 urge shank 8 out of first axial bore 11, forcing balls 7 back into radial bores 20, ejecting shank 8 from the coupler 1.

Thus, a tool coupler 1 and shank are provided which allow the user to insert or eject a tool 3 with one hand. The non-circular cross-section of shank 8 and first axial bore 11 eliminate the need for frictionally gripping the shank 8 in order to impart torque to the shank 8. The ejection feature adds speed to the operation of changing tools 3. No key is required. Very little manual dexterity is required to change tools 3. In fact, tools 3 may be easily changed by a user wearing gloves. This is not easily accomplished with other coupling devices.

Various embodiments of the invention are described above. Other embodiments will occur to those skilled in the art, and are intended to be included within the scope and spirit of the following claims.

I claim:
1. A tool coupler, comprising:
 a. an elongated body having an upper end, a lower end, a first axial bore having a non-circular cross-section, said first axial bore extending at least partially through said body from said upper end toward said lower end, and at least one radial bore extending from said first axial bore to the exterior of said body;
 b. a collar, positioned around said body and having an upper end, a lower end, an inner wall, an outer wall, an outer wall and an annular retaining flange extending radially from said inner wall, said retaining flange being alignable with said radial bore;
 c. a means for gripping a tool shank, positioned in said radial bore and having a greater length than said radial bore such that when said retaining flange of said collar is aligned with said radial bore, said means for gripping a tool shank is urged at least partially into said radial bore;
 d. a means for retaining said collar in position around said body, connected to said collar and said body;
 e. a cap, positioned in said collar, said cap having an upper surface, an outer surface facing said inner wall of said collar, a lower surface and an axial opening at least as large as said aligned with said first axial bore of said body;
 f. a first resilient means, positioned between said cap and said retaining flange of said collar, for urging axial separation between said retaining flange and said cap; and
 g. a means, connected to said upper end of said collar, for retaining said cap within said collar.

2. A tool coupler according to claim 1, wherein said first resilient means comprises a first coil spring having a lower end bearing against said retaining flange of said collar, and an upper end bearing against said cap.

3. A tool coupler according to claim 1, further comprising:
 h. a second resilient means, positioned between said cap and said body, for urging axial separation between said body and said cap.

4. A tool coupler according to claim 3, wherein said second resilient means comprises a second coil spring having a lower end bearing against said body, and an upper end bearing against said cap.

5. A system including the tool coupler according to claim 3, further comprising:
 i. a tool shank having an elongated body having an upper end and a lower end, at least a portion of said shank having a non-circular cross-section, said portion being matingly insertable in said first axial bore, said shank further including a flange extending radially from said upper end of said shank.

6. A tool coupler according to claim 1, wherein said body further includes a second axial bore, concentric with and communicating with said first axial bore, and extending from said first axial bore toward said lower end of said body; a plunger means for receiving the lower end of a tool shank, slidably positioned in said second axial bore; and a spring means for urging said plunger means toward said first axial bore, positioned in said second axial bore.

7. A tool coupler according to claim 2, wherein said cap further includes an outer flange extending radially from said outer surface and having a diameter smaller than that of said inner wall of said collar, and wherein said upper end of said first coil spring bears against said outer flange.

8. A tool coupler according to claim 3, wherein said second resilient means comprises a second coil spring having a lower end bearing against said body, and an upper end bearing against said cap.

9. A tool coupler according to claim 8, wherein said cap further comprises an axial annular flange extending from said lower surface and having a diameter smaller than that of said outer flange, and wherein said upper end of said second coil spring is separated from said upper end of said first coil spring by said axial annular flange.

10. A system including the tool coupler according to claim 1, further comprising:
   h. a tool shank having an elongated body having an upper end and a lower end, at least a portion of said shank having a non-circular cross-section, said portion being matingly insertable in said first axial bore, said shank further including a flange extending radially from said upper end of said shank.

11. A system according to claim 10, wherein said body further includes a second axial bore, concentric with and communicating with said first axial bore, and extending from said first axial bore toward said lower end of said body; a plunger means for receiving said lower end of said tool shank, slidably positioned in said second axial bore; and a spring means for urging said plunger means toward said first axial bore, positioned in said second axial bore.

12. A system according to claim 11, wherein said lower end of said shank is matingly insertable into said plunger means.

13. A tool coupler according to claim 1, wherein said means for retaining said collar in position around said body comprises at least one body stop connected to and extending radially outward from said body and at least one collar stop connected to and extending radially inward from said collar between said body stop and said lower end of said body, such that said collar is prevented from sliding off said upper end of said body by contact between said body stop and said collar stop.

14. A tool coupler according to claim 13, wherein said body stop further comprises a flange extending radially from said body.

15. A rotative tool bit including a shank, said shank comprising an elongated body having an upper end and a lower end said lower end of said shank having a substantially frustum conical configuration, at least a portion of said shank between said upper and lower ends having a regular polygonal cross-section so as to be matingly insertable into a regular polygonal bore, said shank further including at least one indentation in said portion and a flange extending radially from said elongated body at said upper end, the radial extent of said flange being greater than the radial extent of said shank between said flange and said lower end.

* * * * *